US007127361B1

United States Patent
Batey et al.

(10) Patent No.: US 7,127,361 B1
(45) Date of Patent: Oct. 24, 2006

(54) METHOD AND APPARATUS FOR DETERMINING FUEL USE EFFICIENCY FOR COMBUSTION SYSTEMS

(75) Inventors: John E. Batey, Easton, CT (US); Clifford A. Martin, Norwalk, CT (US)

(73) Assignee: Energy Research Center, Inc, Easton, CT (US)

(*) Notice: Subject to any disclaimer, the term of this patent is extended or adjusted under 35 U.S.C. 154(b) by 0 days.

(21) Appl. No.: 10/902,240

(22) Filed: Jul. 29, 2004

(51) Int. Cl.
  *G01F 17/00* (2006.01)
  *G01F 23/00* (2006.01)
  *G01L 7/00* (2006.01)
  *G01N 11/00* (2006.01)

(52) U.S. Cl. ..................................... 702/55
(58) Field of Classification Search ................ 702/45, 702/50, 55, 100, 179–181
  See application file for complete search history.

(56) References Cited

U.S. PATENT DOCUMENTS

| 4,262,530 A | 4/1981 | Gerquest |
| 4,864,972 A | 9/1989 | Batey et al. |
| 5,619,560 A | 4/1997 | Shea |
| 5,947,372 A | 9/1999 | Tiernan |
| 6,105,000 A | 8/2000 | Hickman et al. |
| 6,418,417 B1 | 7/2002 | Corby et al. |

*Primary Examiner*—Michael Nghiem
(74) *Attorney, Agent, or Firm*—James A. Quinton

(57) ABSTRACT

A method and system for determining fuel delivery frequency and volume for a combustion system is provided. A delivery history of fuel deliveries to a fuel combustion system fuel storage tank is collected. The heating degree days for each time period between deliveries is ascertained. The volume of fuel used per day between each delivery is then calculated. A relationship is then established between volume of fuel used per day and heating degree days per day, for the plurality of fuel deliveries for the combustion system. Desirably the relationship is established by plotting the volume used per day vs. heating degree days per day for the combustion system. A desired volume of fuel for the next delivery is chosen. The number of elapsed days from the last delivery and the elapsed number of heating degree days per day are tracked. Periodically, the expected fuel use is calculated using the relationship.

23 Claims, 6 Drawing Sheets

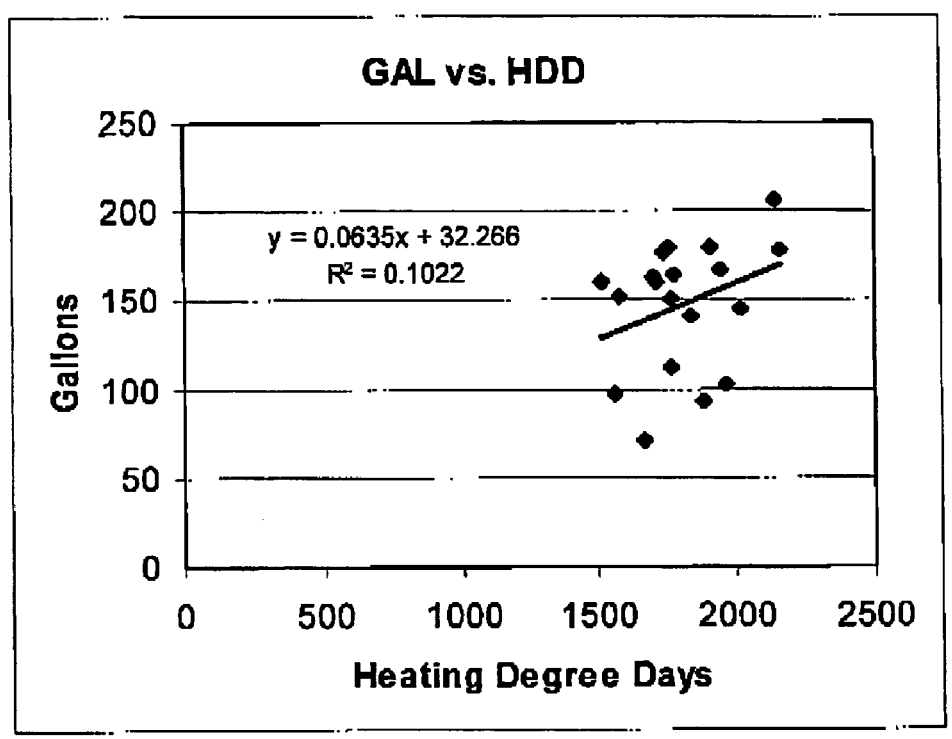
Figure 1a. Predicted Fuel Use with Conventional Heating Degree Day Method Predicted with Fuel Use Profile – (New Method)

Prediction with Fuel Use Profile – New Method

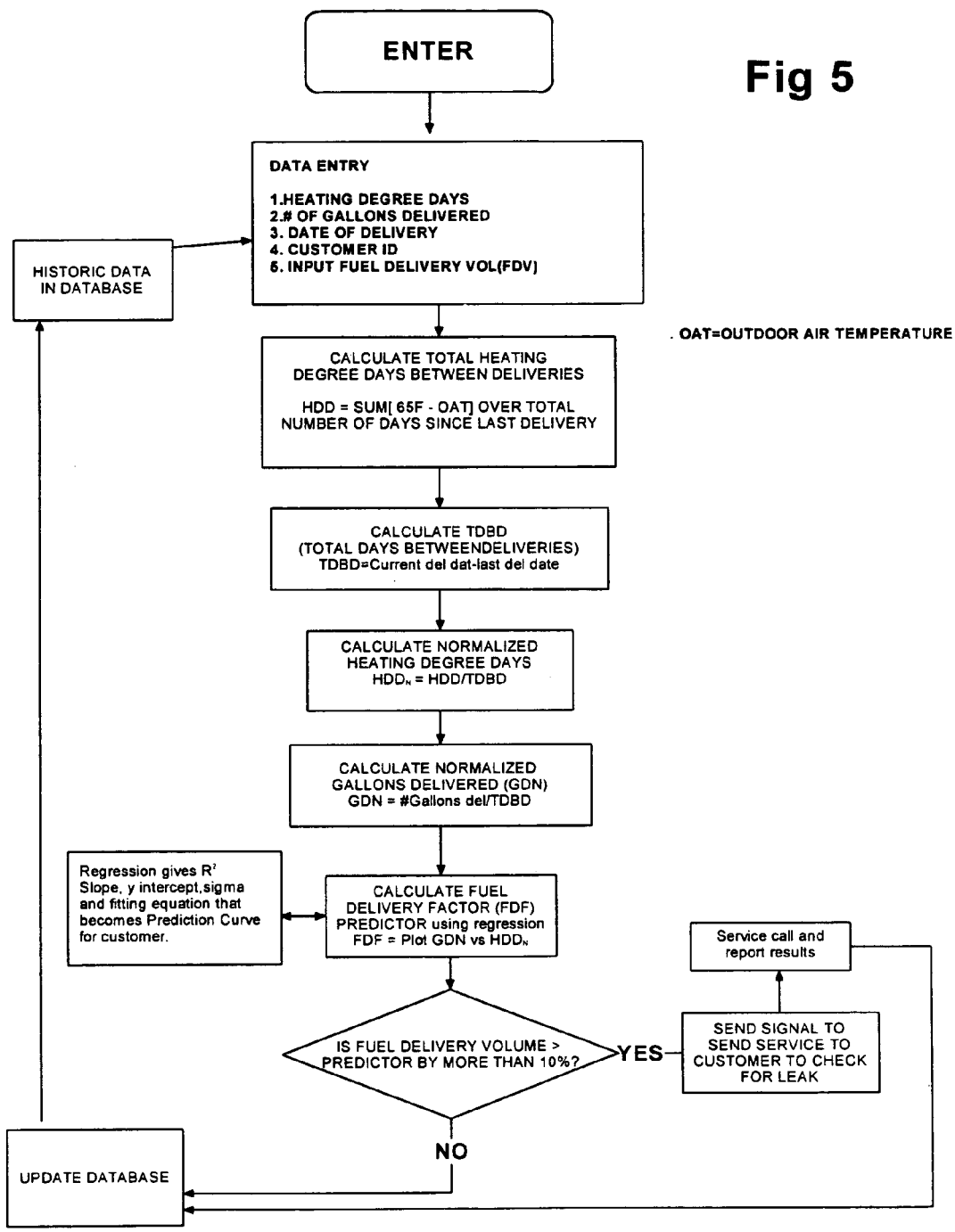

METHOD AND APPARATUS FOR DETERMINING FUEL USE EFFICIENCY FOR COMBUSTION SYSTEMS

BACKGROUND OF THE INVENTION

1. Field of the Invention

The present invention relates to an improved method and apparatus for relating fuel use in a combustion system to outdoor air temperature and an improved method, apparatus and system for scheduling fuel deliveries and detecting fuel leaks for fuel combustion systems and measuring the fuel efficiency of building modifications.

2. Description of the Prior Art

Current methods used by liquid fuel suppliers such as fuel oil and propane companies typically collect information on outdoor air temperature that is used to calculate heating degree days. Heating degree days are generally defined as 65° F. minus the average daily temperature. For example, if the average outside temperature for the day is 40° F., then the number of heating degree days for that 24-hour period is 65−40 which equals 25. The heating degree day method is commonly used by fuel suppliers to estimate when fuel deliveries are needed by evaluating the remaining fuel in the tank as heating degree days accumulated during the heating season. Typically, fuel deliveries are scheduled based on tracking simple heating degree-days which reflect how much heating is required based on outdoor air temperature. As the outdoor temperature drops, heating degree-days increase and more fuel is used.

Fuel marketers use past fuel use and heating degree day data to estimate fuel use and establish k-Factors which are heating degrees day per gallon. These apply only during the heating months. Other estimates are used to modify these factors during periods of heating and non-heating, but with limited accuracy and reliability. These factors are frequently installed in computer systems that monitor fuel use. A fuel delivery target is set, elapsed heating degree days are monitored, and when the K-Factor indicates that the delivery target is reached, a fuel delivery is scheduled.

The conventional heating degree-day method is a poor indicator of actual fuel used especially during intervals of both space heating and non-space heating that commonly occur in buildings. Uncertainties in fuel use prediction on the order of 25% to 50% are commonly observed with the simple heating degree day method. This lack of precision severely limits optimum deliveries in most buildings. In some cases, it over-predicts the remaining fuel in the tank. In other cases it under predicts the remaining fuel. When it over estimates the remaining volume of fuel in the tank, smaller than optimum fuel deliveries occur. When it underestimates the remaining volume of fuel in the tank, customer run-outs occur which are highly undesirable and costly. The overall result of this inaccuracy of the simple heating degree day method is that typically, on average, only about 150 gallons of fuel are delivered to 275 gallon fuel tanks on each fuel drop. This large safety factor is created by the predictive inaccuracies of the simple heating degree day method and substantially increases fuel delivery costs. As a result there remains a need in the art for improved methods to predict the remaining fuel in a fuel tank of a combustion system.

SUMMARY OF THE INVENTION

According to the invention a method, apparatus and system for determining fuel delivery frequency and volume for a combustion system having a fuel tank is provided. The inventive method apparatus and system improve the efficiency of fuel delivery by increasing the reliability of predictions of fuel use for a combustion system having a fuel tank. The fuel use profiles produced according to the subject invention which incorporates both average outdoor air temperature per day and fuel use per day have a high predictive value. According to the invention fuel use predictions that are up to 10 times more accurate than the conventional heating degree day method are provided. Therefore, the predictive value is far superior to conventional methods, and enables new advanced diagnostic capabilities to be implemented. For example, fuel oil tank leaks can be quickly determined which is not possible with the conventional method.

In one aspect of the invention, a method for determining fuel delivery frequency and volume for a combustion system having a fuel tank is provided. A delivery history of two or more fuel deliveries to a fuel combustion system fuel storage tank is collected over a period of time. Each time a delivery is made the fuel tank is substantially filled. The delivery history desirably includes the volume of fuel delivered for each delivery over a period of time for a number of consecutive fuel deliveries, and the number of days elapsing between each delivery of the number of fuel deliveries. The heating degree days for each time period between deliveries is ascertained. This can be calculated from the outdoor air temperature or from charts for the locality involved such as daily average outdoor air temperatures or heating degree days for a specific location as published by the National Oceanic and Atmospheric Administration, or from devices that measure local heating degree days that are used by some fuel marketers. Heating degree days are commonly defined as 65° F. minus the average daily temperature. For example, if the average outside temperature for the day is 40° Fahrenheit, then the number of heating degree days for that 24-hour period is 65−40 which equals 25. However, other heating degree day base temperatures other than 65 F can be used, 60 F for example.

The volume of fuel used per day between each delivery is then calculated. A relationship is then established between volume of fuel used per day referred to herein as the Fuel Use Factor, and heating degree days per day, referred to as the Heat Load Factor, for the plurality of fuel deliveries for the said combustion system. Desirably the relationship is established by plotting the volume used per day vs. heating degree days per day for the combustion system. Alternatively an equation can be mathematically derived. A desired volume of fuel for the next delivery is chosen. Desirably the volume chosen for delivery is chosen at 70% or more of the fuel tank volume. The number of elapsed days from the last delivery and the elapsed number of heating degree days per day are tracked. Periodically, the expected fuel use is calculated by applying the relationship between volume per day of fuel used and heating degree days per day from tracked number of elapsed days from the last delivery and the elapsed number of heating degree days per day. A signal indicating the combustion system fuel tank requires the desired volume amount is then provided. The fuel supplier then dispatches a truck to fill the tank.

In another aspect of the invention, a method of predicting which fuel combustion systems may be leaking is provided. The delivery history is updated by inputting the volume delivered by the fuel truck in response to the signal. An expected fuel use is calculated by applying the relationship between volume per day of fuel used and heating degree days per day from the number of elapsed days from the current delivery and the last delivery (the delivery just prior to the current delivery) and the elapsed number of heating degree days per day between the last delivery and the current delivery to provide an expected fuel use. This amount is compared with the volume of the current delivery. A leak signal is sent when the current delivery volume exceeds the expected fuel use by a preselected amount.

The preferred embodiment of the present invention is illustrated in the drawings and examples. However, it should be expressly, understood that the present invention should not be limited solely to the illustrative embodiment.

BRIEF DESDRIPTION OF THE DRAWINGS

FIG. 1a is a plot of heating degree days vs. gallons used.

FIG. 5 is an alternative flow chart of an alternative embodiment according to the invention.

DETAILED DESCRIPTION OF THE INVENTION

Figure 1B:
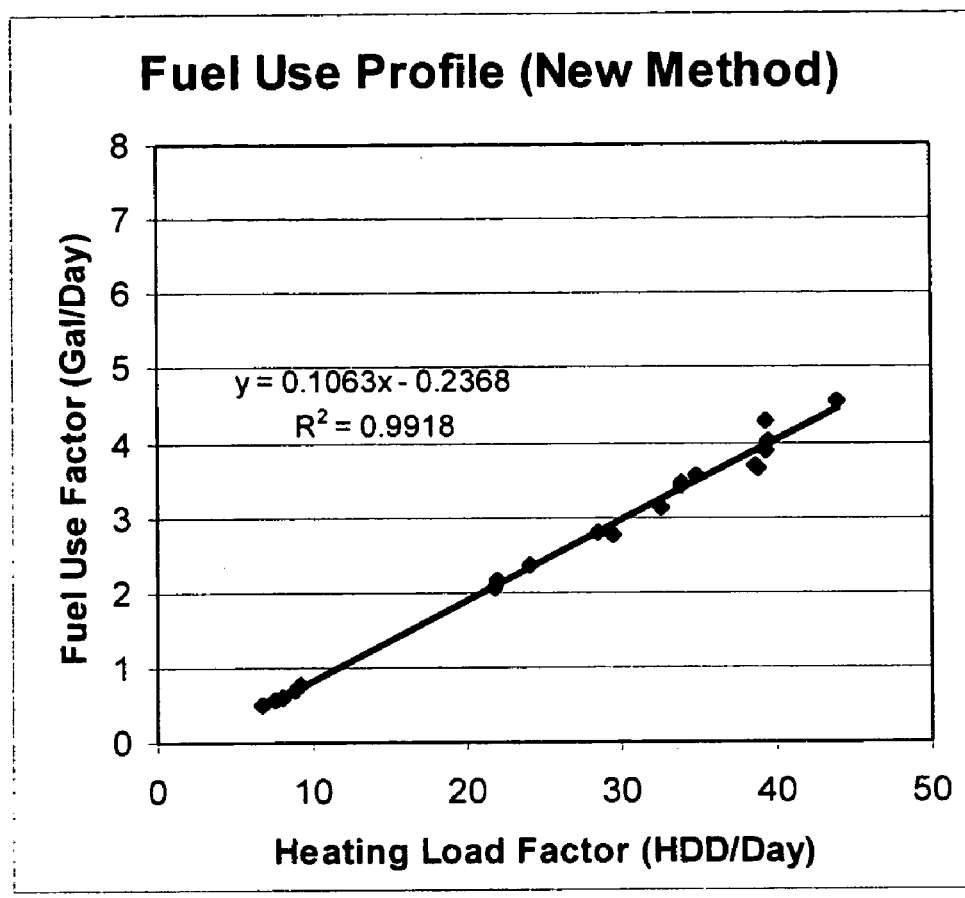
FIG. 1b is a graph showing predicted fuel use profile according to the invention.

According to the invention a method, apparatus and system for determining fuel delivery frequency and volume for a combustion system having a fuel tank is provided. The inventive method and apparatus improve the efficiency of fuel delivery by increasing the reliability of predictions of fuel use for a combustion system having a fuel tank. Prior art methods using heating degree days can result in smaller than optimal fuel deliveries which can increase the number of fuel deliveries over time thereby increasing the total costs of these deliveries. In some cases, use of the heating degree day method under estimates fuel use and customer run-outs of fuel occur. A serious deficit in the degree day method is its inability to accurately track fuel used during non-heating periods (typically the months of May through October in the Northern Hemisphere).

In one aspect of the invention, a method for determining fuel delivery frequency and volume for a combustion system having a fuel tank is provided. The fuel tanks come in a variety of sizes. For fuel oil the tanks are typically 275 gallons in size although 330 gallon, 550 gallon and 1000 gallon tanks are common. Propane is stored in pressurized tanks. Desirably the fuel is liquid preferably fuel oil or propane. A delivery history of a number preferably a plurality of fuel deliveries to a fuel combustion system fuel storage tank is collected over a period of time. Each time a delivery is made the fuel tank is substantially filled. Desirably the delivery history is collected for a number of systems for example the customers of a supplier. The delivery history desirably includes the volume of fuel delivered for each delivery for a number of consecutive fuel deliveries over a period of time. At a minimum a fuel history of two deliveries is required. Desirably 3 or more preferably 5 or more are used. Desirably a fuel history over an extended period time is used, preferably for one year or longer desirably two or more years. The delivery history also includes—the number of days elapsing between each delivery of the number of fuel deliveries. According to the invention, the heating degree days for each time period between deliveries is ascertained. This can be calculated from the daily averaged outdoor air temperature for each day in each time period or from charts for the locality involved such as heating degree day meters, or local data from the National Oceanic and Atmospheric Administration. Heating degree days are typically defined as 65° F. minus the average daily temperature. For example, if the average outside temperature for the day is 40° Fahrenheit, then the number of heating degree days for that 24-hour period is 65–40 which equals 25.

The volume of fuel used per day between each delivery is then calculated. A relationship is then established between volume of fuel used per day and heating degree days per day for the fuel deliveries of the delivery history for the combustion system. Desirably the relationship is established by plotting the volume of fuel used per day vs. heating degree days per day for the combustion system. See for example FIG. 1b. Alternatively an equation can be mathematically derived by establishing the linear relationship between the Heat Load Factor (Heating Degree days per Day) and the Fuel Use factor (Gallons of fuel used per day). Such mathematical relationships are determined through linear regression analyses which are an established and well-known methodology. A desired volume of fuel for the next delivery is chosen. Desirably the volume chosen for delivery is chosen at about 70% or more of the useful fuel tank volume preferably, about 70% to 90% most desirably 75% to 85%. Typically the useful tank volume is about 90% of the tank volume. The useful fuel tank volume is the size of the fuel tank less space provided to prevent overfilling. The number of elapsed days from the last delivery and the elapsed number of heating degree days per day are tracked. Periodically expected fuel use is calculated by applying the relationship between volume per day of fuel used and heating degree days per day from the tracked number of elapsed days from the last delivery and the elapsed number of heating degree days per day. A signal indicating the combustion system fuel tank requires the desired volume amount of fuel, 200 gallons for example, is then provided. The fuel supplier then dispatches a truck to fill the tank. Preferably after each delivery the most recent delivery data will be added to the delivery history and the delivery history updated.

In another aspect of the invention, a method of predicting which fuel combustion systems may be leaking is provided. Occasionally there is a failure of the fuel tank or fuel piping system and a leak occurs. From an environmental and safety standard point, it is important to detect leaks quickly. According to the invention, the delivery history is updated by inputting the volume delivered by the fuel truck in response to the signal. An expected fuel use is calculated by applying the relationship between volume per day of fuel used and heating degree days per day from the number of elapsed days from the current delivery and the last delivery (the delivery just prior to the current delivery) and the elapsed number of heating degree days per day between the last delivery and the current delivery to provide an expected fuel use. This amount is compared with volume of the current delivery. A leak signal is sent when the current delivery volume exceeds the expected fuel use by a preselected amount desirably by about 6% or more, preferably by about 10% to 20%, desirably by about 10% or more. The customer can be contacted and/or service personnel sent to investigate.

In another aspect of the invention, a method of determining fuel use efficiency from modification to a building having a combustion system which uses a fuel tank is provided. The modifications to the building could be to the combustion system itself by, for example, installing a new burner or providing repairs or additions to the existing combustion system. Modifications to the building serviced by the combustion system could be the addition of insulation, replacement of windows or the addition of insulating doors or the like. According to the invention, a fuel history for a number of fuel deliveries to the fuel tank, preferably two or more fuel deliveries over a preselected period of time prior to the modification are collected. Each delivery substantially fills the fuel tank. The deliveries include the volume of fuel delivered for each delivery and the number of days lapsing between each delivery for the number of deliveries. The heating degree days for each time period between deliveries is ascertained. The volume of fuel used per day is calculated. A relationship is then established between volume of fuel used per day and heating degree days per day for the number of deliveries for the combustion system as described above in detail in connection with the method for determining fuel delivery frequency. The modification to the building is then performed which is intended to improve fuel use efficiency. After such modification is completed, the fuel tank is filled. One or more after modification fuel deliveries are made and the date and fuel volumes are recorded. The number of elapsed days between filling the fuel tank after the modification and the after modification fuel delivery and the elapsed number of heating degree days per day are determined. An expected fuel use is determined by applying the relationship between volume per day of fuel use and heating degree days from the number of elapsed days and the elapsed number of heating degree days per day from the delivery history. The expected fuel use is then compared to the fuel use after modification. The amount of saved fuel of cost saving from them from the modification can then be calculated. Preferably, several fuel deliveries after modification are employed to obtain a more reliable and reproduceable determination of fuel cost or fuel use savings from the modification.

According to the invention, a stand-alone computer-based system for example a PC to determine fuel delivery frequency and volume is provided. Such computer is programmed according to the invention. Manual tracking methods can also be employed for fuel suppliers with or without the aid of computers.

Figure 2:
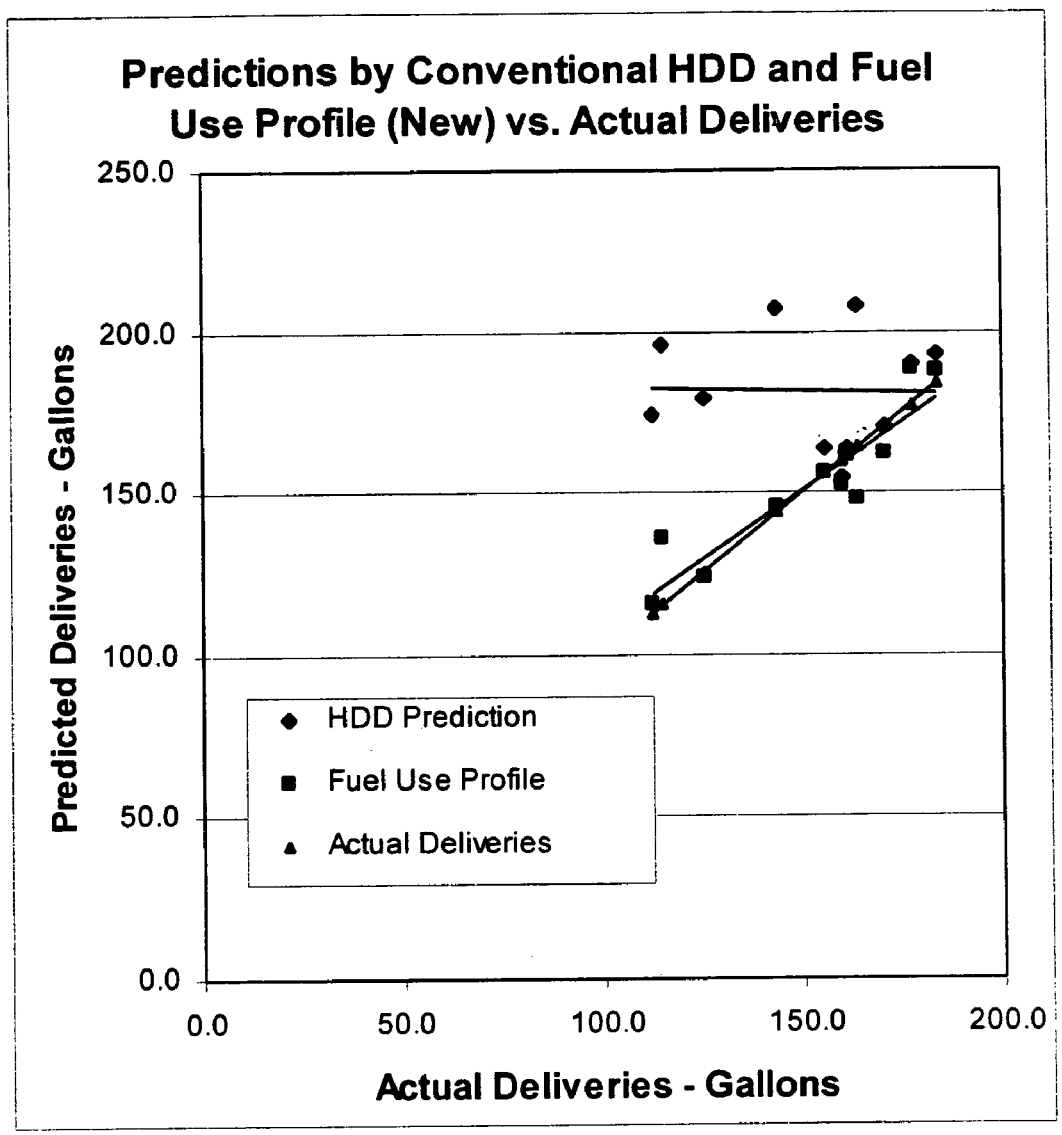
FIG. 2 is a comparison of fuel delivery predictions using heating degree day method and the fuel use profiles according to the invention compared to actual delivery.

As best seen by referring to FIGS. 1 to 2, prior art methods of estimating fuel usage can be inaccurate. The method of the subject invention provides a substantial increase in the accuracy of the prediction of fuel use over the prior art. Referring to FIG. 1a which is an example plot of predicted fuel use as determined by the conventional heating degree day method, one can see the inaccuracy that occurs with the prior art method. The individual data points in the FIG. 1a are for separate deliveries that occurred over a period of several years for one building. There is a large scatter in the gallons of fuel delivered for varying heating degree days shown on the x-axis. For a heating degree day value of about 1700, the gallons of fuel oil delivered ranges from approximately 70 gallons to about 180 gallons. This is a range of 110 gallon for the same heating degree day value, and indicates the large error and uncertainty of the simple heating degree day method. This is an error of 88%. The R-squared value for a linear fit is only 0.1022 which shows a very poor correlation. The Heating Degree Day method simply cannot predict with accuracy the volume of fuel that will be used.

The physical significance of the large uncertainty in fuel consumption with the conventional heating degree day method is noteworthy. If the heating degree day interval between deliveries is 1700, a fuel supplier will not know whether there the fuel tank requires 70 gallons or 180 gallons. Therefore, it is impossible to schedule fuel deliveries in an optimum way. If the average value is used as shown by the line in the figure, there remains uncertainty in the neighborhood of 50 gallons. Therefore a safety factor is needed to prevent fuel tank run-outs. This explains why typical fuel oil deliveries average only about 150 to 160 gallons for 275 gallon fuel oil storage tanks having a fillable volume of about 240 to 250 gallons.

The present invention addresses this issue by creating a significantly more accurate method for tracking fuel oil use in a building and enabling more optimal delivery practices. FIG. 1b is a plot of predicted fuel use and deliveries for the present invention which uses the new fuel use factors and heat load factors as defined earlier. The data points of the plot show fuel deliveries for several years to a single building. Note that the scatter of the data is much smaller than for FIG. 1a. Most of the data points are touching the line which represents a linear curve fit. The R-squared value is exceptionally high at 0.9918, which is approaching a perfect fit of 1.0. Using plot 1b to determine when to deliver a preselected volume is done by periodically, weekly, every other day, preferably daily, calculating the heating degree days per day that have elapsed and determining the expected fuel use until the desired volume for fuel delivery is reached. Assume that there is a heating load factor of 30 HDD/day for a 50 day period and a desired delivery volume of 200 gallons. FIG. 1b shows for this heating system there would be a fuel use of 3 gallons/day for a total consumption of 150 gallons. If the heating load remains constant (unlikely in practice), the desired delivery volume is reached on the 67th day (201 gallons). A signal is then sent and the fuel company dispatches a truck.

The table that follows summarizes the error analysis for the present invention method for an example case. Prediction accuracy will vary for different buildings, and the following is for illustrative purposes.

|  | Actual Gal | Predicted Gal | DIFF Gal | Abs DIFF Gal |
|---|---|---|---|---|
|  | 180 | 166 | −14 | 14 |
|  | 152 | 149 | −3 | 3 |
|  | 120 | 125 | 6 | 6 |
|  | 142 | 138 | −4 | 4 |
|  | 177 | 174 | −2 | 2 |
|  | 164 | 163 | −2 | 2 |
|  | 146 | 146 | 0 | 0 |
|  | 174 | 170 | −4 | 4 |
|  | 191 | 189 | −2 | 2 |
|  | 119 | 112 | −6 | 6 |
|  | 157 | 165 | 8 | 8 |
|  | 190 | 194 | 4 | 4 |
|  | 159 | 160 | 1 | 1 |
|  | 173 | 167 | −5 | 5 |
|  | 191 | 186 | −4 | 4 |
|  | 168 | 168 | 0 | 0 |
|  | 129 | 127 | −3 | 3 |
|  | 180 | 190 | 10 | 10 |
|  | 154 | 164 | 10 | 10 |
|  | 171 | 177 | 6 | 6 |
| AVG | 162 | 162 | 0 | 5 |

The maximum error in calculated fuel delivery with the present invention in the example case was only 14 gallons which occurred for one delivery. Two deliveries have a prediction error of 10 gallons, and one delivery has an error of 8 gallons. All the remaining 16 deliveries have a prediction error of 6 gallon or less. The average difference between predicted an actual delivery was only 5 gallons with an average delivery of 162 gallon, producing and overall error of about 3%. This example illustrates the excellent accuracy potential of the new invention for tracking fuel use in predicting and scheduling fuel deliveries for buildings.

The improvement in prediction accuracy for fuel storage tanks with the present invention has important practical applications. First, larger volume fuel deliveries can be scheduled so that fewer deliveries are required and delivery costs are reduced. If the prediction uncertainty is improved to less than 20 gallons, and the typical fuel oil storage tank can hold 275 gallons, 240 to 250 useful volume, then it is possible to significantly increase the average volume of fuel dropped per delivery above the 150 to 160 gallons that is typically observed. An increase in average deliveries to 200 gallons can reduce the number of deliveries by approximately 25 to 33 percent. The higher precision also allows new diagnostic capabilities to be added to the existing fuel tracking systems.

The invention allows fuel oil leaks to be detected more rapidly, and in many cases on the first delivery after the leak occurs. This is not possible with existing heating degree day base tracking methods. The wide range in gallons versus the degree days with conventional methods does not allow fuel leak detection as easily, and in many cases it is not possible at all. This is partly the result of large uncertainties that occur during non-heating times when a heating degree day factor has limited value. In contrast, the present invention includes time as an input parameter, which easily identifies excessive fuel use as a function of outdoor temperature and time duration. Changes in building use patterns (vacations or other periods of reduced energy use) are also easily detected by the new methodology.

FIG. 2 compares the predictions of fuel use by conventional heating degree day methods and by the fuel use profiles produced by the present invention to actual fuel deliveries. This is a side-by-side comparison of the conventional method in the present invention. The figure shows data for the same house for a period of several years. The upper curve shows predicted fuel deliveries using conventional heating degree day methods. This method predicts deliveries ranging from approximately 150 to 200 gallons. The actual deliveries are shown by the lower curve with the triangles. For many of the deliveries, the heating degree day method does not accurately predict fuel deliveries. In one case the predicted fuel delivery is 196 gallons, but the actual delivery is only 115 gallons. In some cases the heating degree day method provides a good estimate, but in other cases it does not. This lack of reliability limits its usefulness.

The prediction of fuel deliveries by the fuel use profile method of the present invention is very close to the actual deliveries as observed in FIG. 2. The linear regression line for the fuel use profile predictions is virtually coincident with the linear regression line for the actual deliveries. The errors in predicting fuel deliveries are much lower for the present invention than for the conventional heating degree day method.

Figure 3:
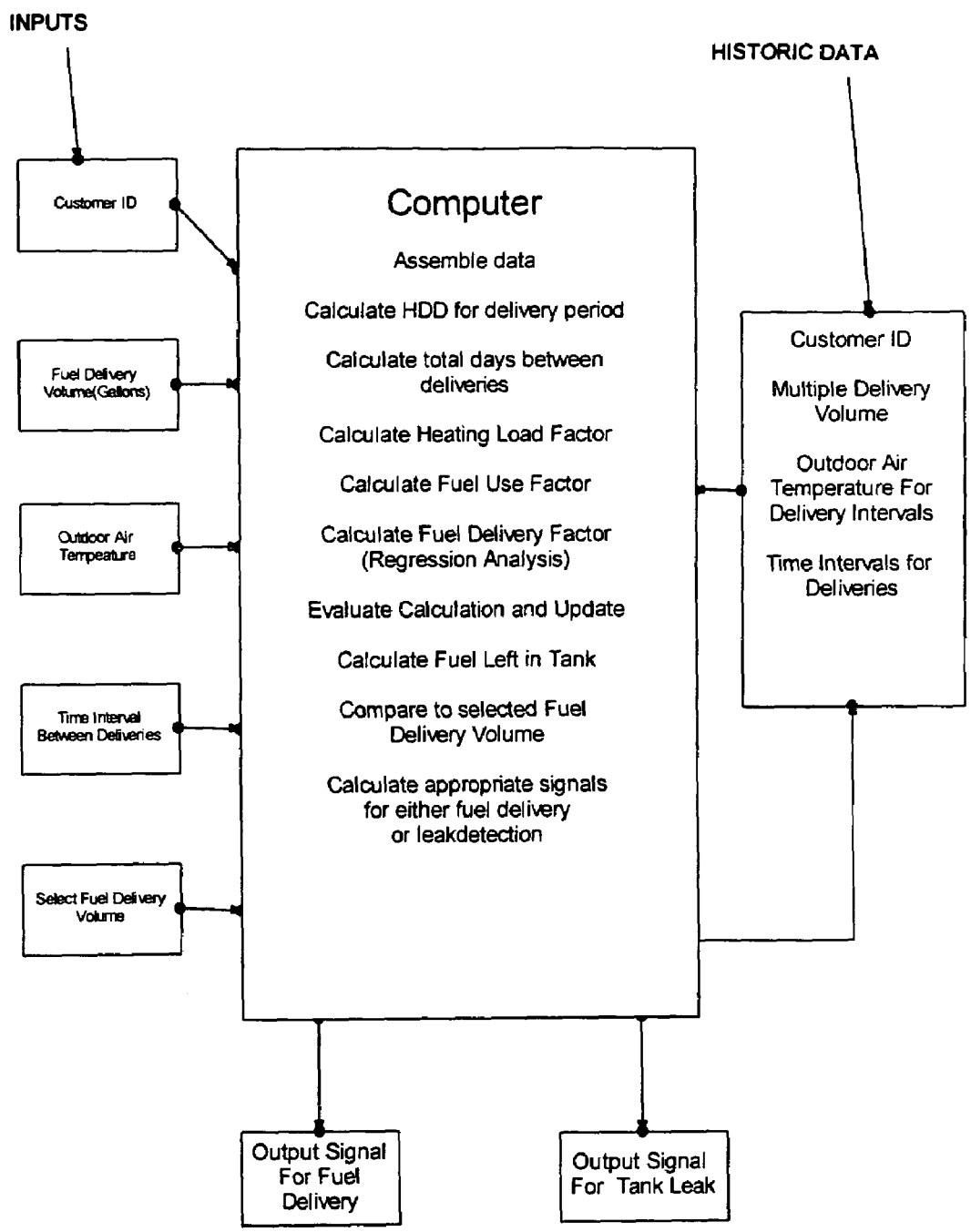
FIG. 3 is a schematic diagram of an apparatus used according to the invention to perform the fuel use profile procedures.
Figure 4:
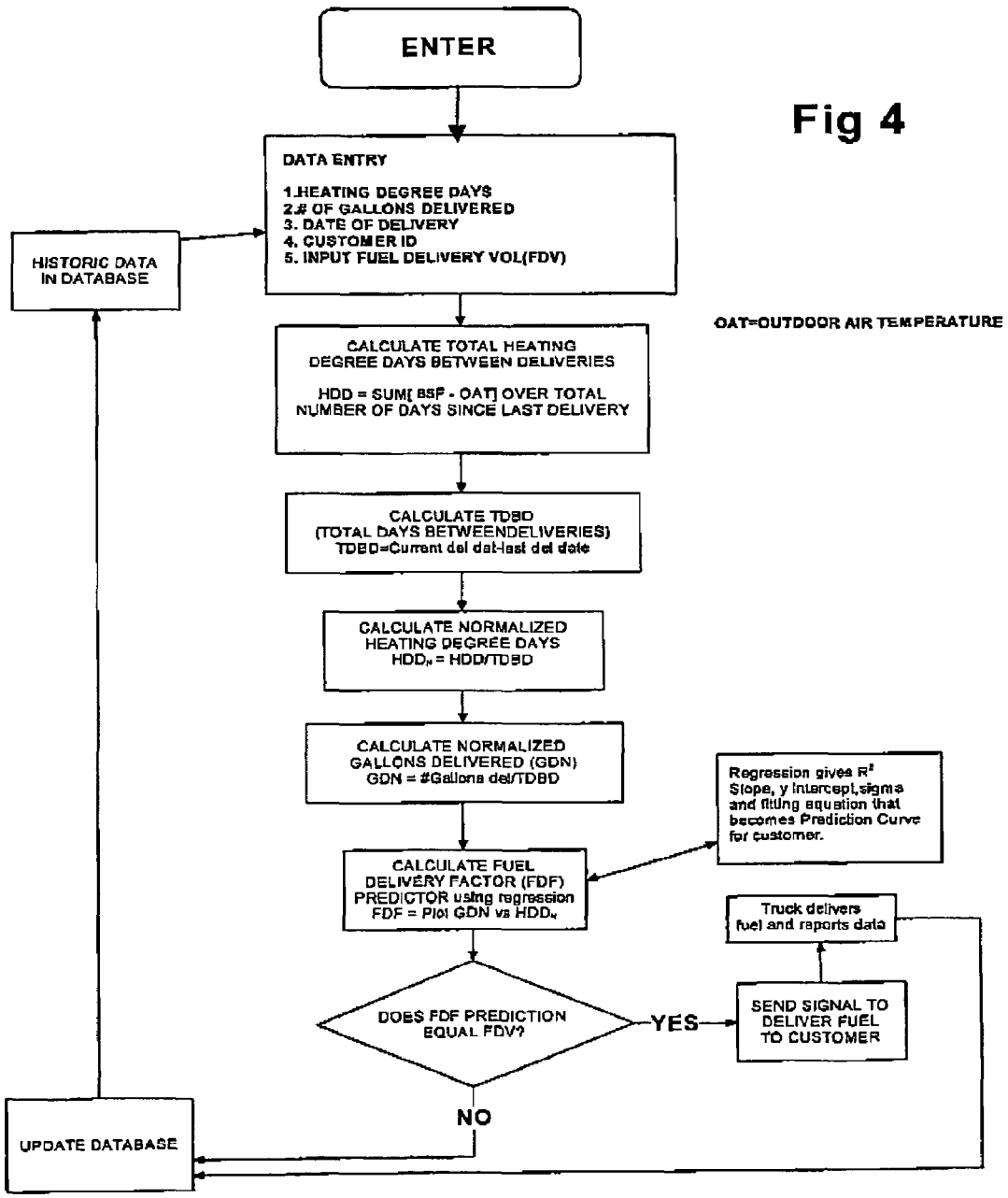
FIG. 4 is a flow chart according to the invention.

As best seen in FIGS. 3 through 5, a system for fuel use prediction is provided. According to the invention, a computer is provided preferably a PC. As best seen in FIG. 3, historic data is inputted. This data includes heating degree days, number of gallons, date of delivery, customer identification information and fuel delivery volume. As best shown in FIG. 4, from the inputted data, total heating degree days between deliveries is calculated. The total heating degree day interval since the previous delivery, HDD, is equal to the sum of 65° F. minus the average outdoor air temperature for each day. The average outdoor air temperature each day can be derived from data supplied by the fuel delivery company or from the National Oceanic and Atmosphere Administration. Alternatively, charts of heating degree days for particular dates and locations are also available. Next, the total days between deliveries is calculated (TDBD). Next, a calculation is made of the normalized heating degree days ($HDD_n$) which is equal to the heating degree days divided by the total days between deliveries (HDD/TDBD). Next, a calculation of normalized gallons delivered is made by dividing the number of gallons delivered by the total days between deliveries (GAL/TDBD). Then a Fuel Delivery Factor predictor (FDF) is calculated using regression analysis. The Fuel Delivery Factor predictor is generated from the plot of normalized gallons delivered GDN vs. normalized heating degree days $HDD_n$. The regression analysis gives $R^2$, slope, y-intersept, sigma and a fitting equation that becomes the prediction curve and equation for that customer. The Fuel Delivery Factor predictor is then used to calculate fuel use and the volume of fuel remaining in the tank as a function of elapsed HDD per Day. This volume is then compared to a pre-selected fuel delivery volume, for example, a 200 gallon target for a typical 275 gallon tank. If this target is reached, a signal is sent indicating that fuel should be delivered to the customer. A truck is then dispatched with fuel and reports the delivery data, namely, customer identifier, date of delivery, and volume of delivery which is inputted into the computer's database to update the historical data. If the volume of fuel remaining in the tank as calculated by using the elapsed heating degree days per day in combination with the historic Fuel Delivery Factors for the building is less than the fuel delivery volume, then no signal is sent. At a predetermined further interval, the process is repeated with updated elapsed days and heating degree days. Further calculations are made periodically until the fuel delivery volume, FDV, is reached. Preferably, the method is repeated daily optionally weekly, every other day or at some other predetermined interval.

As best seen in FIG. 5, a leak detector system according to the invention is provided. Similarly to the fuel delivery system of FIG. 4, a prediction of the amount of fuel that should have been delivered is made. The Fuel Delivery Factor predictor is multiplied by the elapsed HDD/DAY between the last delivery and the current delivery. The predicted volume in gallons is calculated by multiplying the resultant GAL/DAY by the number of elapsed days, and it is then compared to the actual fuel delivery volume. If the actual fuel delivery volume exceeds the predicted volume by a preselected amount, by about 6% or more desirably 10% to 20%, preferably 10% or more, a signal is sent to check the combustion system for fuel leaks.

It should be understood by those skilled in the art that various modifications may be made in the present invention without departing from the spirit and scope thereof, as described in the specification and defined in the appended claims. The foregoing is considered as illustrative only to the principles of the invention. Further, since numerous changes and modification will occur to those skilled in the art, it is not desired to limit the invention to the exact construction and operation shown and described above, and accordingly all suitable modifications and equivalents may be resorted to, falling within the scope of the invention.

What is claimed is:

1. A method of determining fuel delivery frequency and volume for a combustion system having a fuel tank said fuel tank having a fuel tank volume, comprising:
   a) collecting a delivery history of a number of fuel deliveries to said fuel tank over a preselected period of time, each said delivery substantially filling said fuel tank, said delivery history including:
      i) volume of fuel delivered for each said delivery of said plurality of fuel deliveries and
      ii) number of days elapsing between each said delivery of said plurality of fuel deliveries; and
   b) ascertaining heating degree days for each time period between deliveries;
   c) calculating a volume of fuel used per day between each delivery;
   d) establishing a relationship between the volume of fuel used per day and heating degree days per day for said plurality of fuel deliveries for said combustion system;
   e) selecting a desired volume of fuel for the next delivery;
   f) tracking the number of elapsed days from a last fuel delivery to said combustion system and the elapsed number of heating degree days per day;
   g) periodically calculating an expected fuel use by applying said relationship between volume per day of fuel used and heating degree days per day from said tracked number of elapsed days from the last delivery and the elapsed number of heating degree days per day until said expected use equals said desired volume of fuel;
   h) providing a delivery signal indicating said combustion system fuel tank requires said desired volume amount.

2. The method of claim 1 further comprising dispatching a fuel truck with load of fuel to deliver at least said desired volume of fuel to said fuel tank in response to said signal and filling said tank to supply a current delivery current delivery volume of fuel at a current delivery date.

3. The method of claim 2 further comprising:
   i) recording the current delivery volume;
   j) calculating an expected fuel use by applying said relationship between volume per day of fuel used and heating degree days per day from the number of elapsed days from the current delivery and said last delivery and the elapsed number of heating degree days per day between said last delivery and said current delivery; to provide an expected fuel use;
   k) comparing said expected fuel use to said current delivery volume;
   l) providing a leak signal where said current delivery volume exceed said expected fuel use by a preselected amount.

4. The method according to claim 3 wherein said relationship of d) and f) above is established by plotting volume per day used vs heating degree days per day for said plurality of fuel deliveries for said combustion system.

5. The method of claim 3 wherein said leak signal is provided when said current delivery volume exceeds said expected fuel use by 10% or more.

6. The method of claim 3 wherein said leak signal is produced where said current delivery volume exceeds said expected fuel use by 6% or more.

7. The method according to claim 1 wherein said relationship of d) above is established by plotting volume per day used vs. heating degree days per day for said plurality of fuel deliveries for said combustion system.

8. The method of claim 1 wherein said desired volume in e) is 70% or greater of said fuel tank volume.

9. The method of claim 1 further comprising said fuel is heating oil.

10. The method of claim 9 wherein said desired volume in e) is 70% or greater of said useful fuel tank volume.

11. The method of claim 10 wherein said desired volume in e) is 70% to 90% of said useful fuel tank volume.

12. The method of claim 11 wherein said desired volume in e) is 75% to 85% of said useful fuel tank volume.

13. The method of claim 1 further comprising said fuel is propane.

14. The method of claim 1 wherein in a) said preselected time period is one year or more.

15. The method of claim 1 wherein in a) said number of deliveries is two (2) or more deliveries.

16. The method of claim 1 wherein in a) said plurality of deliveries is three (3) or more deliveries.

17. A method of determining fuel use efficiency from modification to a building having combustion system having a fuel tank said fuel tank having a fuel tank volume, comprising:
   a) collecting a delivery history of a plurality of fuel deliveries to said fuel tank over a preselected period of time prior to said modification, each said delivery substantially filling said fuel tank, said delivery history including:
      i) volume of fuel delivered for each said delivery of said plurality of fuel deliveries and
      ii) number of days elapsing between each said delivery of said plurality of fuel deliveries; and
   b) ascertaining heating degree days for each time period between deliveries;
   c) calculating volume of fuel used per day between each delivery;
   d) establishing a relationship between volume of fuel used per day and heating degree days per day for said plurality of fuel deliveries for said combustion system;
   e) modifying said building to improve its fuel use efficiency;
   f) filling said tank after said modification;
   g) making an after modification fuel delivery after said tank was filled after said modification and recording an after modification fuel volume;
   h) calculating the number of elapsed days between filing said tank after modification and said after modification fuel delivery and the elapsed number of heating degree days per day;
   i) calculating an expected fuel use by applying said relationship between volume per day of fuel used and heating degree days per day from said tracked number of elapsed days and the elapsed number of heating degree days per day;
   j) comparing said expected fuel use to said after modification fuel volume.

18. A method of determining fuel use efficiency of a modification to a building according to claim 17 further comprising determining the amount of saved fuel or cost saving from said modification.

19. A method of determining fuel use efficiency of a modification to a building according to claim 17 wherein said modification is to said combustion system.

20. The method according to claim 17 further comprising making two or more after modification fuel deliveries and recording the total of said tank after modification fuel volume;

calculating the total elapsed days between filling said tank after modification and after the modification fuel deliveries and the number of heating degree days for said total elapsed days.

21. A system for determining fuel delivery frequency and volume for a combustion system having a fuel tank said fuel tank having a fuel tank volume, comprising:

a computer said computer including:
 a) a delivery history data base for a number of different combustion systems for a number of fuel deliveries to each combustion system over a preselected period of time, each said delivery substantially filling said fuel tank, said delivery history including
  i) volume of fuel delivered for each said delivery of said plurality of fuel deliveries and
  ii) number of days elapsing between each said delivery of said plurality of fuel deliveries; and
 b) a heating degree days data base for each time period between deliveries;
 c) means to calculate a volume of fuel used per day between each delivery;
 d) means to establish a relationship between the volume of fuel used per day and heating degree days per day for said plurality of fuel deliveries for said combustion system;
 e) a data base of a desired volume of fuel for the next delivery to each combustion system;
 f) means to track the number of elapsed days from a last fuel delivery to each said combustion system and the elapsed number of heating degree days per day;
 g) means to periodically calculate an expected fuel use by applying said relationship between volume per day of fuel used and heating degree days per day from said tracked number of elapsed days from the last delivery and the elapsed number of heating degree days per day until said expected use equals said desired volume of fuel;
 h) a signal indicating said combustion system fuel tank requires said desired volume amount.

22. A system for determining fuel delivery frequency and volume for a combustion system according to claim 21 wherein said means to establish a relationship between the volume of fuel used per day and heating degree days per day for said plurality of fuel deliveries for said combustion system includes plotting volume per day used vs. heating degree days per day for said plurality of fuel deliveries for each said combustion system.

23. A system for determining fuel delivery frequency and volume for a combustion system according to claim 21 wherein said means to establish a relationship between the volume of fuel used per day and heating degree days per day for said plurality of fuel deliveries for said combustion system and applying regression analysis thereto.

* * * * *